April 4, 1933. D. J. CAMPBELL 1,903,405
TIRE
Original Filed Jan. 20, 1930 2 Sheets-Sheet 1

Inventor
Donald J. Campbell
By Liverance & Van Antwerp
Attorneys

Patented Apr. 4, 1933

1,903,405

UNITED STATES PATENT OFFICE

DONALD J. CAMPBELL, OF MUSKEGON HEIGHTS, MICHIGAN

TIRE

Application filed January 20, 1930, Serial No. 421,884. Renewed January 20, 1932.

This invention relates to tires and is particularly concerned with pneumatic tire casings and treads wherein the tread is relatively heavy and is subjected to severe usage and heavy duty as on trucks so that the tread is very liable to be worn away before the remainder of the tire requires discarding.

It is an object and purpose of the present invention to provide a construction of tire wherein the tread is separate from the body of the pneumatic tire casing and by reason of such separate construction may be replaced by a new one when the old tread has been worn to a state beyond further usefulness, means being used to effectively connect the tread to the tire casing in a detachable manner whereby the worn out tread may be removed when replacement is desired.

The invention may be understood from the following description, taken in connection with the accompanying drawings, in which, Fig. 1 is a side elevation, with some parts broken away and shown in section, illustrating the tire construction of my invention.

Like reference characters refer to like parts in the different figures of the drawings.

Figure 1:
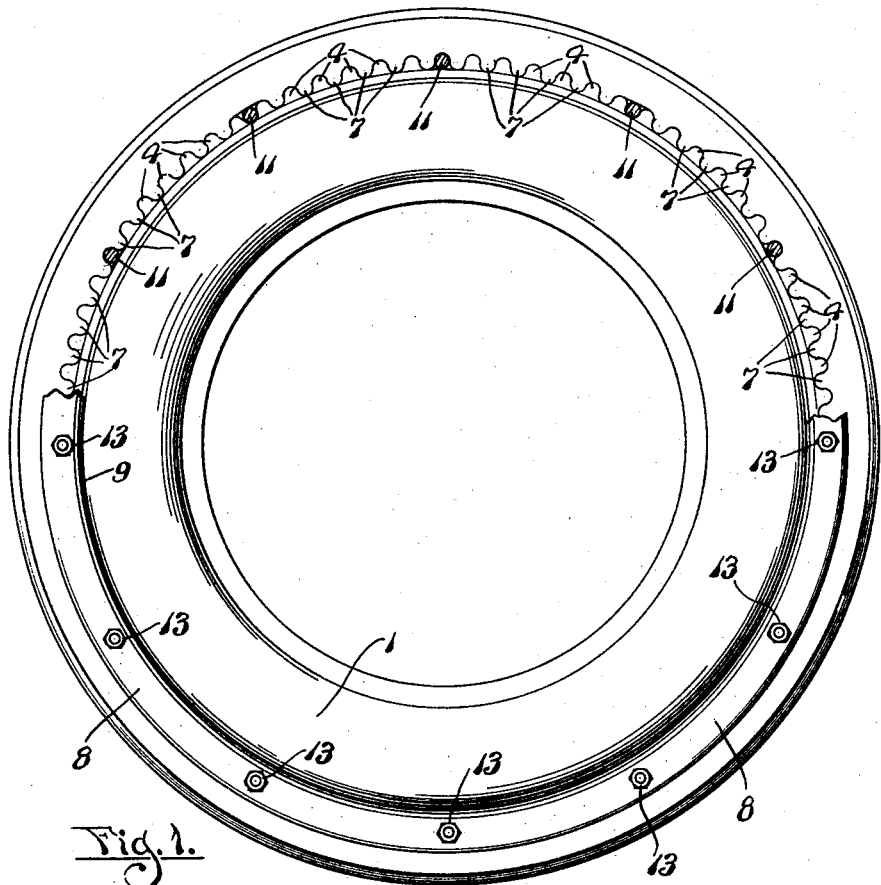

The tire casing 1 is of conventional pneumatic type within which an air holding tube is to be placed, the casing having the regular rim engaging beads to connect with the rim of a wheel. The outer side 2 of the casing is substantially flat, as shown in Figs. 2 and 3, and is undercut at its side edges, as indicated at 3, while projecting outwardly from said outer side 2 are a plurality of spaced apart transverse ribs 4 which, as shown in the drawings, are comparable to the successive teeth of a gear.

Figures 2, 3:
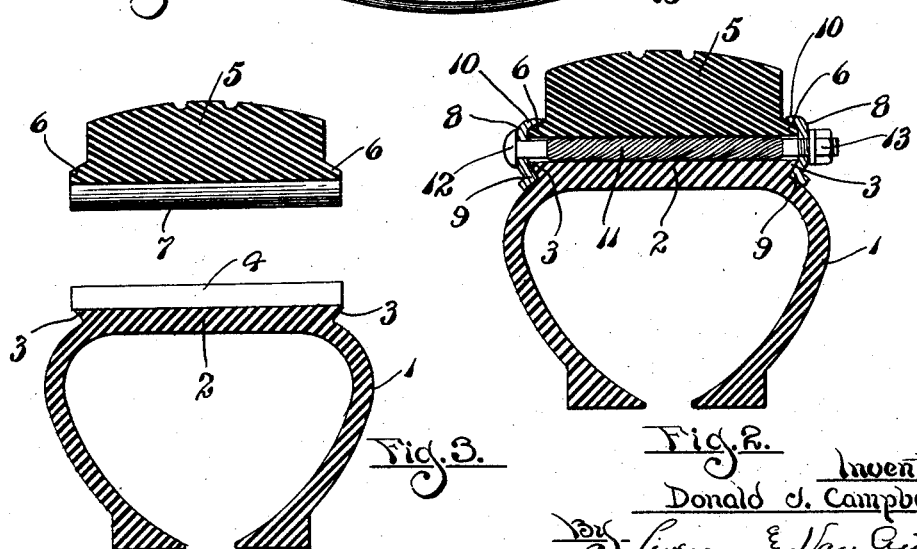
Fig. 2 is an enlarged transverse vertical section through the tire casing and tread attached thereto.
Fig. 3 is a similar vertical section showing the casing and tread separate.
Figure 4:
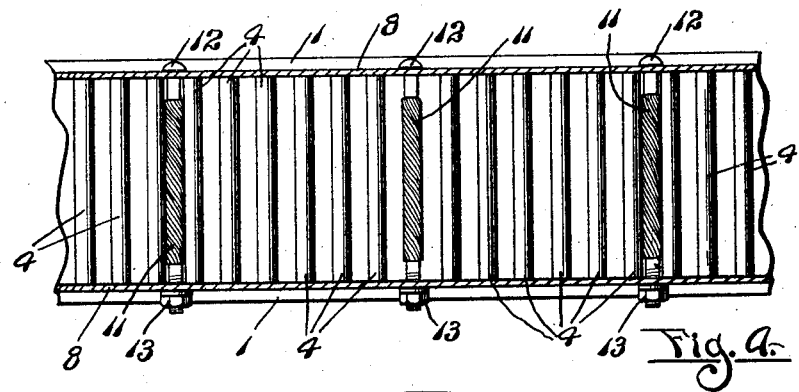
Fig. 4 is a fragmentary plan view of the tire casing, the tread member being removed, but the connecting means for attaching the tread to the casing being shown in section.

The tread 5 is of any suitable construction and is relatively heavy and thick and adjacent its inner side is widened somewhat providing the inclined shoulders 6, best shown in Fig. 3. At the inner side of the tread a cooperating successive series of transverse inwardly projecting ribs 7 are provided to interlock with the ribs 4, fitting in the spaces between them. In practice the tread is slipped onto the casing sidewise and the ribs 4 and 7 are tapered in the direction of their projection so that the narrow portions of the ribs 7 enter the wider portions of the grooves or recesses between the ribs 4, the parts coming into close contact when the tread is properly positioned around the casing. In practice any suitable vulcanization prevention material, such as soap stone or the like, may be placed on the outer and inner sides, respectively, of the casing and tread so that the contacting parts will not vulcanize together in service as might otherwise occur.

When the tread 5 has been placed over and around the casing it is locked and secured in place by two continuous metal circular rings 8 located at opposite sides of the tire and extending over the joints between the casing and tread. The inner edge portions of the rings 8 are formed to fit in the recesses underneath the undercut portions 3 of the casing, as indicated at 9, while the outer edge portions of the rings 8 are bent inwardly to provide continuous annular lips 10 engaging over the shoulders 6 of the tread.

The rings 8 are secured in place and are bound together and against the opposite sides of the tire by means of a plurality of cross bolts 11 which, preferably, are of twisted flexible wire cable, one end of which is suitably welded together and formed into a head 12 while the other end is welded together and threaded to receive a nut 13. The bolts 11 pass through the rings 8 and at properly spaced apart distances ribs 4 and 7 on the tire casing and on the tire tread are cut away for the passage of the bolts, so that around the tire there is an alternate removal of a rib 4 on the tire casing and a rib 7 on the tire tread. The openings bored through the rings 8 are properly located to come opposite the spaces left by such removal of alternate ribs 4 and 7 and when connected in place the tread 5 is firmly secured to the casing. It is, however, apparent that when the tread wears down to a point where its usefulness is about over, removing the nuts 13, bolts 11 and the rings 8 permits a removal of the worn out tread and its replacement by a new tread.

Figure 5:
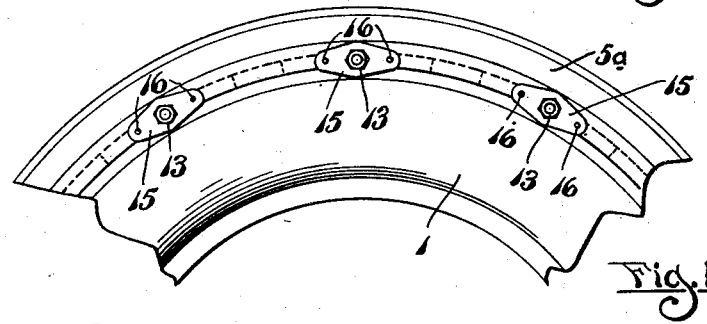
Fig. 5 is a fragmentary elevation similar to that shown in Fig. 1 showing a modified form of construction of separable tire casing and tread therefor.
Figure 6:
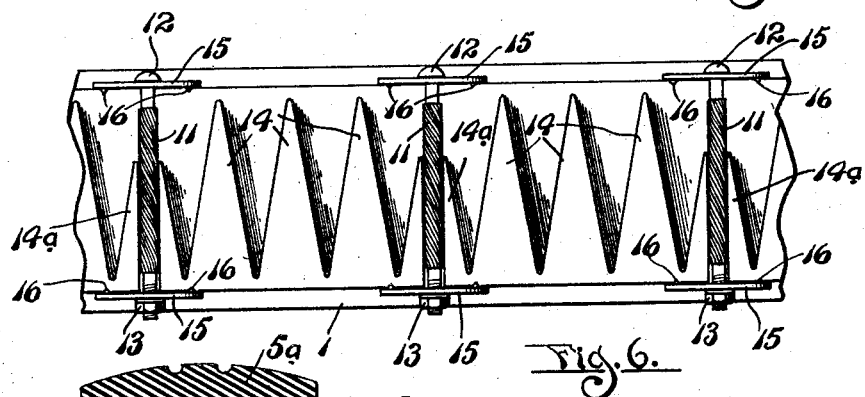
Fig. 6 is a fragmentary plan view thereof similar to that shown in Fig. 4.
Figure 7:
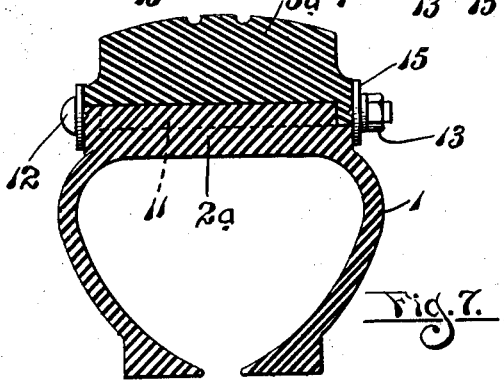
Fig. 7 is a transverse vertical section, similar to that shown in Fig. 2, of the second or modified form of construction, the casing and tread being connected together.

In Figs. 5 to 7 inclusive, a different form or modification of the invention is shown. The casing 1 at its outer side 2a is provided with a plurality of outwardly extending projections 14 which taper to a point all toward one side of the casing while the bases of the projections are continuously joined as shown in Fig. 6. The tread 5a at its inner side is similarly provided with inwardly extending projections of like tapering form but shaped so that the tapered ends of the projections on the tread 5a may enter the recesses between the projections 14 and then the tread moved laterally so as to be located around the tire casing. The same type of flexible bolts 11 with heads 12 to receive nuts 13 are used but instead of continuous rings 8, relatively short flat plates 15 of metal are used for the heads 12 to bear against and against which the nuts 13 may be screwed at the requisite points. At properly spaced distances cross grooves are cut in the projections 14a (see Fig. 6) and between corresponding complementary projections of the inner side of the tread 5a to make openings through which the bolts may pass. Preferably, the plates 15 may be provided with inwardly projecting tangs 16 their inner sides to press into the rubber of the casing and tread. This construction likewise provides a detachable tread which may be replaced when worn beyond a state that it is no longer useful, together with a means for securing the tread on and around the tire casing.

With the constructions described the replacement of worn out treads by new ones is readily attained and at the same time while the tread is on a casing it is held in place so as to be in effect the same as though integral with the casing. The tread can not creep around the casing even though it is physically separate therefrom and is readily separable when the mechanical connecting means used is removed. Many variations in structure coming within the scope of my invention may be made without departing therefrom. The invention, accordingly, is to be considered comprehensive of all forms of structure coming within the scope of the claims appended hereto and is not to be restricted to any exact specific detailed construction as illustrated and described.

I claim:

1. In combination, a tire casing having a substantially flat outer circumferential side formed with a plurality of spaced apart outwardly extending projections separated by recesses, said projections and recesses being disposed transversely of the outer side of the casing and said projections being wider at one end than at the other, a tire tread formed with like projections at its inner side with its projections and recesses being wider at one end than at the other and reversed with respect to recesses and projections on the casing whereby the tread may be positioned on the casing by applying the same to the tire at one side and moving it laterally over said tire, and means for detachably connecting the tread to the casing to hold the tread against lateral movement and also against radial movement with respect to said casing.

2. In combination, a tire casing, a separable tread located around the casing, complementary projections on the outer side of the casing and inner side of the tread interlocking with each other to hold the tread against creeping movement, a plurality of bolts located in spaced apart relation around the casing and inside the tread, having heads at one end and nuts threaded onto the opposite ends, and circular bands of metal through which the bolts pass located one at each side of the casing and tire and covering the joints between them, said bolts at their intermediate portions and substantially the full width of the tread being of flexible wire cable and having end portions welded to provide heads and threaded shanks to receive nuts, substantially as described.

3. In combination, a tire casing having a plurality of spaced apart outwardly extending projections around it, a circular tread having a plurality of spaced apart inwardly extending projections at its inner side adapted to fit in the recesses between the projections on said casing, said recesses and projections being tapered whereby the tread is held from lateral movement in one direction, said tread having an inner diameter of such size as to allow it to be slid sidewise over the outer portion of the tire casing, and means for connecting the casing and tread and holding the tread against lateral movement in the other direction with respect to the casing.

4. In combination, a tire casing, a separable tread located around the casing, and a plurality of bolts interconnecting the casing and tread, said bolts at their intermediate portions being of flexible wire cable and having end portions fastened to provide heads and threaded shanks to receive nuts.

5. In combination, a tire casing, a separable tread located around the casing, complementary projections on the outer side of the casing and inner side of the tread interlocking with each other to hold the tread against creeping movement and a plurality of means extending alternately through the projections on the casing and those on the inner side of the tread for the purpose described.

6. In combination, a tire casing having circumferential grooves extending therearound at opposite sides thereof, a separable annular tread located around the casing, said tread having its inner side substantially the same width as the tire casing and then being slightly narrowed whereby inclined shoulders are formed thereon, rings located at either side of said casing and tread, said rings having portions extending into the grooves in the casing and extending over the shoulders on the tread and means extending between said rings for holding them in position.

In testimony whereof I affix my signature.

DONALD J. CAMPBELL.